United States Patent
Suh et al.

(10) Patent No.: US 9,294,275 B2
(45) Date of Patent: Mar. 22, 2016

(54) METHOD AND APPARATUS FOR UPDATING A GROUP KEY IN A WIRELESS COMMUNICATION SYSTEM

(75) Inventors: Kyung Joo Suh, Seoul (KR); Sung Ho Choi, Suwon-si (KR); Beom Sik Bae, Suwon-si (KR); Young Kyo Baek, Seoul (KR); Sang Soo Jeong, Suwon-si (KR); Seung Woo Seo, Seoul (KR); Young Hoon Park, Seoul (KR); Dong Hyun Je, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 130 days.

(21) Appl. No.: 14/131,590

(22) PCT Filed: Jul. 9, 2012

(86) PCT No.: PCT/KR2012/005433
§ 371 (c)(1),
(2), (4) Date: Jan. 8, 2014

(87) PCT Pub. No.: WO2013/009061
PCT Pub. Date: Jan. 17, 2013

(65) Prior Publication Data
US 2014/0140511 A1    May 22, 2014

(30) Foreign Application Priority Data

Jul. 8, 2011 (KR) ........................ 10-2011-0067887

(51) Int. Cl.
*H04L 9/08* (2006.01)
*H04L 29/06* (2006.01)
*H04W 12/04* (2009.01)

(52) U.S. Cl.
CPC ............ *H04L 9/0891* (2013.01); *H04L 9/0836* (2013.01); *H04L 63/065* (2013.01); *H04W 12/04* (2013.01); *H04L 2209/601* (2013.01)

(58) Field of Classification Search
CPC ... H04L 9/0836; H04L 9/0891; H04L 63/065; H04L 2209/601; H04W 12/04
USPC ........................................... 380/273
See application file for complete search history.

(56) References Cited

U.S. PATENT DOCUMENTS

| 2006/0029226 | A1* | 2/2006 | Han et al. ........................ 380/44 |
| 2006/0140411 | A1* | 6/2006 | Zhu ................................ 380/277 |
| 2008/0080713 | A1* | 4/2008 | Cho et al. ...................... 380/273 |
| 2010/0174899 | A1* | 7/2010 | Lin et al. ....................... 713/153 |
| 2011/0249817 | A1* | 10/2011 | Park et al. ..................... 380/281 |

FOREIGN PATENT DOCUMENTS

| KR | 10-0660385 B1 | 12/2006 |
| WO | 2004/030294 A1 | 4/2004 |
| WO | 2005/086412 A1 | 9/2005 |

* cited by examiner

*Primary Examiner* — Baotran N To
(74) *Attorney, Agent, or Firm* — Jefferson IP Law, LLP

(57) ABSTRACT

The present invention relates to a method and apparatus for updating a key for encrypting multicast data in a wireless communication system. The method of the present invention is characterized by comprising: an information receiving step of receiving information on a group entry time and a group exit time from users who have newly entered an arbitrary group including at least one subgroup; a grouping step of grouping the users using the information on the group entry time and the group exit time; and a key transmission step of either transmitting, to the newly-entered users, keys related to the group and the subgroups, or updating, for the remaining users of the subgroups, both the key related to the subgroup to which the user exiting the group belongs and the key of the group and then transmitting the updated keys to the users of the subgroups.

10 Claims, 15 Drawing Sheets

FIG. 15
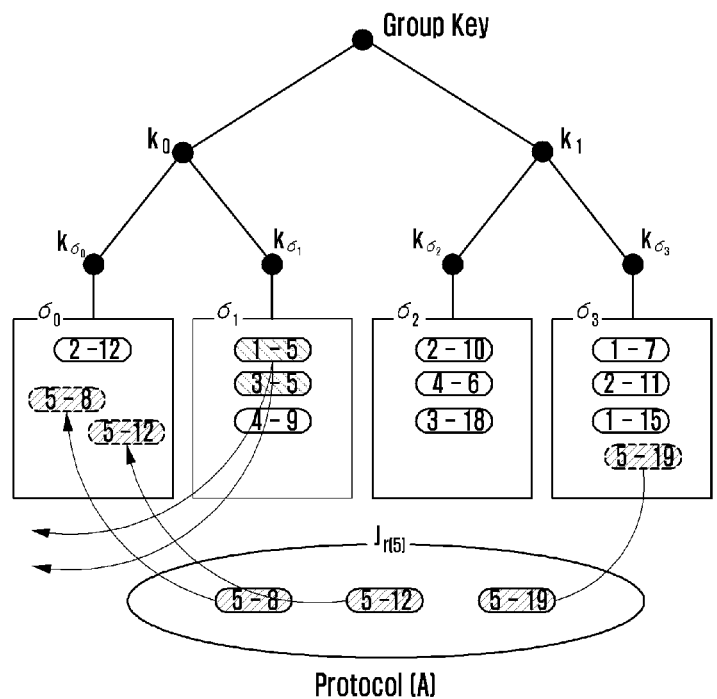
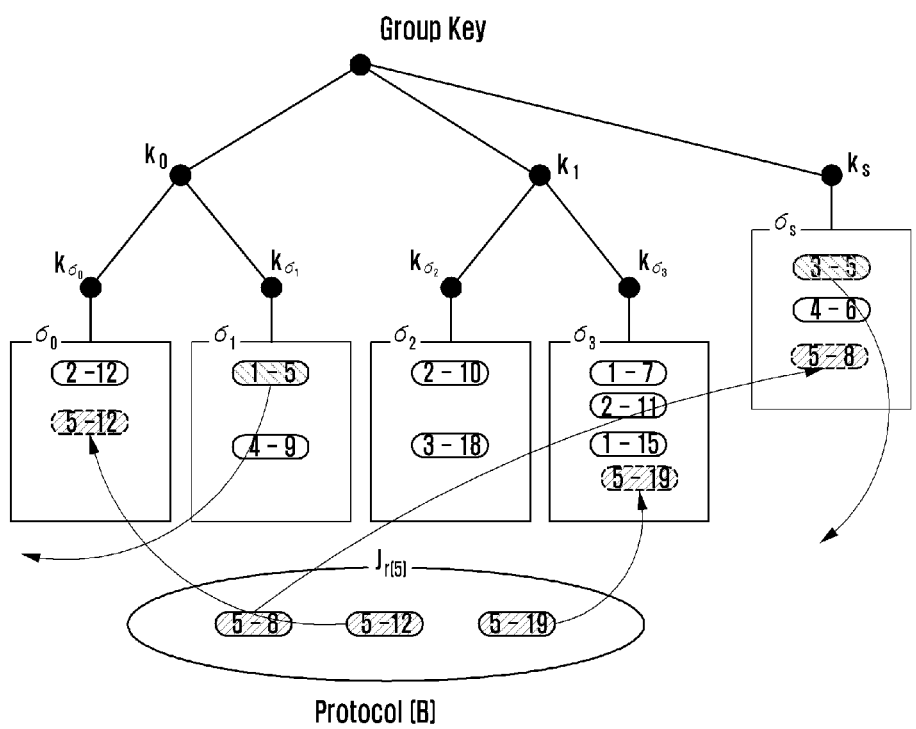

METHOD AND APPARATUS FOR UPDATING A GROUP KEY IN A WIRELESS COMMUNICATION SYSTEM

TECHNICAL FIELD

The present invention relates to a group key update method and apparatus in a wireless communication system. In more particular, the present invention relates to a key update method and apparatus for sorting the users departed a group at the same into another group and, if necessary, updating a key of the group in a batch manner.

BACKGROUND ART

Multicast is a technique for sending data efficiently to a plurality of persons simultaneously with the least network bandwidth. Unlike unicast consuming n channels for transmitting to n users, the multicast makes it possible to transmit data to n users with 1/n channels required for the unicast. Such a multicast service is capable of providing application services such as pay TV, online game, and video conference efficiently. However, since all of the users within the reception range can receive the data, there is a need of an access control technique.

Such an access control technique is implemented in the way of accomplishing the security goal of the multicast data by encrypting the multicast data and sharing a group key among the group members. In the access control technique, a Key Distribution Center (KDC) is responsible for managing the group key.

For the security of the multicast data, it is necessary to guarantee the forward secrecy after the key update and the backward secrecy before the key update and thus the KDC has to update the key when there is any change in group members due to entry and departure of group users. The frequent key updates caused by the dynamicity of the group members incur high communication and security costs.

There is therefore a need of an efficiently group key reconfiguration method for used in the wireless communication system using multicast.

DISCLOSURE OF INVENTION

Technical Problem

The present invention has been conceived in an effort to solve the above problem and aims to provide a key update method and apparatus that is capable of sorting the users departed a group at the same time into another group and, if necessary, updating the keys of the group in a bundle.

Solution to Problem

In accordance with an aspect of the present invention, a key update method of encrypting multicast data in a wireless communication system includes receiving information on group entry times and group entry times of users entering newly a certain group including at least one subgroup, sorting the users into the at least one subgroup based on the group entry and departure times, sending the users a group key of the group and subgroup keys of the corresponding subgroups respectively, and updating, when a user departs from the group, the subgroup key of the subgroup from which the user departs and the group key and transmitting the updated subgroup key and group key to the users remained in the group.

In accordance with another aspect of the present invention, an apparatus of updating and delivering keys encrypting multicast data in a wireless communication system includes an interface unit which receives information on group entry times and group entry times of users entering newly a certain group including at least one subgroup and a control unit which sorts the users into the at least one subgroup based on the group entry and departure times, sends the users a group key of the group and subgroup keys of the corresponding subgroups respectively, and updates, when a user departs from the group, the subgroup key of the subgroup from which the user departs and the group key and transmitting the updated subgroup key and group key to the users remained in the group.

Advantageous Effects of Invention

The key update method and apparatus of the present invention sorts the users departed a group at the same time into groups and, if necessary, updates the key of the group. This is capable of reducing indirect cost for storing keys and removes unbalance of the key tree so as to achieve high efficiency in updating keys through batch key update.

BRIEF DESCRIPTION OF DRAWINGS

FIG. 15 is a diagram illustrating the key distribution and assignment procedure according to Protocol A and Protocol B according to an embodiment of the present invention.

MODE FOR THE INVENTION

The present invention is applicable to a Group Controller (GC) or a Key Distribution Center (KDC) (hereinafter, interchangeably used with key distribution apparatus) managing the keys encrypted for security in the multicast communication.

The GC or KDC managing keys for secure communication may be any of HSS, HLR, UE, eNB, and MME in the 3GPP system and all entities using multicast in other systems than 3GPP system. This is because the mobile terminal may work as the host of communication in the future services. That is, unlike the conventional services in which the operator owning the KDC such as server is the host, the future services may be hosted by mobile terminal such as UE in the prediction of multicast services of the users. Accordingly, a mobile device has to have a KDC for secure communication and perform update dynamically in adaptation to the mobile environment. In the case of applying the present invention, it is possible to determine the key update timing capable of minimizing cost by taking notice of the communication and security costs depending on the service.

The present invention is applicable to all the types of group communication-capable devices updating keys periodically in the situation of communicating based on the group key shared among group members for secure group communication.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

The batch key update method, apparatus, and system of the present invention are applicable to the server, terminal, and KDC responsible for distributing keys. If the key updated time arrives, the KDC assigns the keys to the group users who manage the keys assigned by the KDC. For secure transmission, the multicast data are encrypted with a group key shared among the group users.

Suppose that a user departs the group. Since the departed user has the group key for use in receiving a broadcast service, it is necessary to generate a new key for maintaining the secrecy from the departed user. The KDC generates a new key and delivers the new key to the group members. The key is encrypted with the individual key of each user for delivery.

In this way, the new group key is delivered to the group with exception of the departed user. Accordingly, the data secrecy can be maintained with the group key which is not known to the departed user.

Descriptions are made of key update methods based on the key structure, key update time, and the user arrangement in the key tree briefly hereinafter.

First, a key structure-based key update method is described.

The key structure-based key update method may be classified into one of flat tree and tree-based key management.

Figure 1:
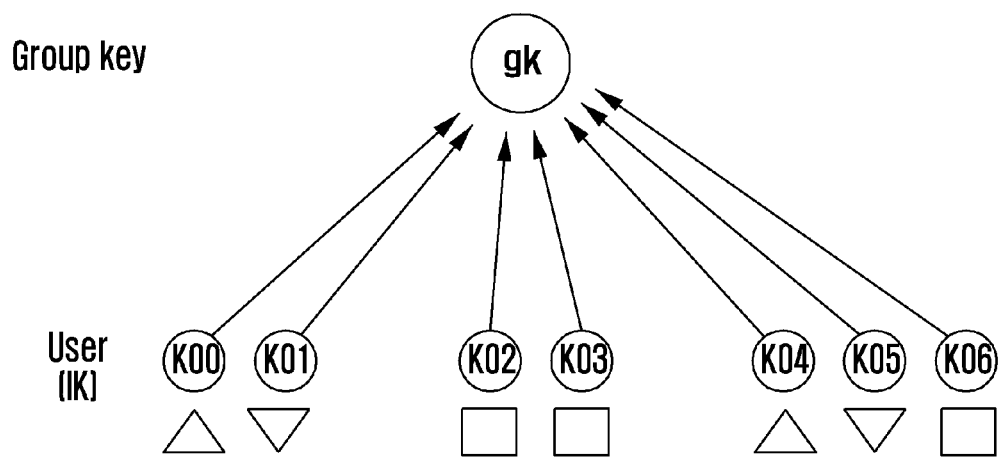
FIG. 1 is a diagram illustrating an exemplary flat tree structure.

A description is made of the flat tree first. FIG. 1 is a diagram illustrating an exemplary flat tree structure.

As described above, if a new user enters or an old user departs, the KDC generates a new key to maintain the secrecy of the data and delivers the newly generated key to the group members. The flat tree structure-based delivery method transmits the group key encrypted with the Individual Key (IK) of each user unlike the LKH to be described later.

As shown in FIG. 1, the flat tree is composed of two layers, i.e. Group Key and IK without intermediate KEK unlike LKH to be described later.

However, since the new group key is encrypted with IKs of the individual users who have not departed, if one of n members departs, n−1 messages have to be generated for the users and thus, as the number of devices increases, it is likely to cause scalability problem.

Figure 2:
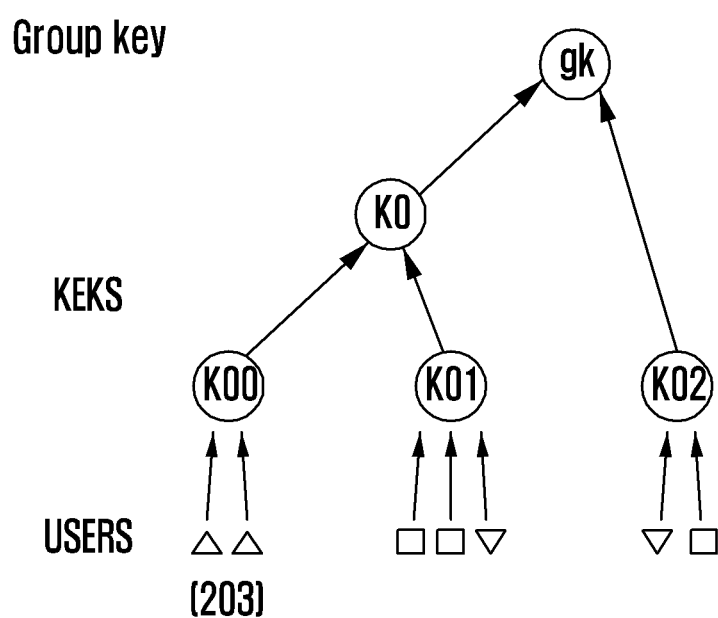
FIG. 2 is a diagram illustrating an exemplary Logical Key Hierarchy (LKH) structure as one of the tree-based key management.

FIG. 2 is a diagram illustrating an exemplary Logical Key Hierarchy (LKH) structure as one of the tree-based key management.

As shown in the flat tree, if a new device enters or if an old device departs, the KDC generates a new key to maintain the secrecy of the data and delivers the newly generated key to the group members.

Unlike the flat tree encrypting the new group key with the individual keys (IK), the LKH transmits the key generated with the key encryption key (KEK) located in the middle of the hierarch more efficiently.

In the flat tree, the new group key is encrypted with individual IKs of the devices and thus, if one of n members departs, n−1 messages are required for transmitting the new key to the devices, which may causes scalability problem as the number of devices increases.

In order to solve this problem, the tree-based key management has been developed, and the Logical Key Hierarchy (LKH) is used frequently as one of the tree-based key management techniques. The LKH is a key update method for transferring the group to a plurality of users using KEK on a logical hierarchical layer. This is capable of transfer the new group key to a plurality of users so as to reduce the number of required messages as compared to the method of transmitting the key to the individual users.

The group key is managed by the key layer and, when it is transmitted for security, encrypted with a key of one layer away. An exemplary LKH-based key tree is described with reference to FIG. 2.

In FIG. 2, g denotes the group key for use in encrypting data; and k0, k00, k01, and k02 denote KEKs for use in encrypting a higher layer key in LKH.

In FIG. 2, if the users 203 depart the group, it is necessary to update the keys gk and k0 in such a way of gk→gk' and k0→k0'. Since the new key generation method is out of the scope of the present invention, detailed description thereon is omitted herein. Meanwhile, k00 is not necessary to update because all of the users knowing the key have departed. For secure delivery of gk' and k0', the GC multicasts the following messages.

KDC->Users: M1=Enc(gk', k0')
KDC->Users: M2=Enc(gk', k02)
KDC->Users: M3=Enc(k0', k01);

Here, MI denotes the encrypted message, and Enc(a,b) denotes that the data a has been encrypted with b.

The users received the messages decrypt the multicast messages to acquire the newly updated keys as follows.

gk'=Dec(M1, k0')
gk'=Dec(M2, k02)
k0'=Dec(M3, k01)

Here, Dec(a,b) denotes that data a is decrypted with key b.

A description is made of the key update method based on the key update timing.

The key update timing-based key update method includes: Individual rekeying and Batch rekeying.

Among them, the individual rekeying is described first.

The aforementioned access control technology helps the service manager manage a plurality of users in combination with multicast. However, suppose a situation where one of the users is not managed any longer. Since the user who cannot receive the service any longer has the TEK for use in receiving the user management message, it is necessary to generate a new key for protecting the secrecy (confidentiality) from the user. The KDC generates a new key and deliver the key to the users.

The delivery is made in such a way of encrypting the new TEK with IK and KEK of each user. In this case, the users receiving the management service may receive the new TEK while the user who does not receive the service any more cannot receive the new TEK. Afterward, the secrecy can be protected through the user management service using the newly updated TEK.

The key management method in which the key is updated immediately when there is a change in members of a group receiving the service is referred to as Individual Rekeying.

In the Individual Rekeying, the number of messages to be transmitted for maintaining the secrecy is equal to the number of users of which IKs are sued for encrypting the new TEK. This can be normalized in such a way that if one of n users departs the service total n−1 messages are necessary for transmitting the new keys to the remained users.

Although there is no problem when the number of user is small, if the number of users increases, this is likely to incur scalability. Meanwhile, the periodic batch rekeying proposed for updating the key efficiently is very efficient to update the key for the a large group of users with compromise of security to some extent. Unlike the conventional individual rekeying, KDC or GC waits, although some users enter or depart the group, for a predetermined time to update the key instead of updating the key immediately.

In the periodic rekeying method, the KDC may replace the departed user with the newly entered user such that the key path including the users departed the service is updated at a time and the key to be updated on the key path from the leaf to the root may be shared by several paths and thus the number of keys to be updated decreases significantly.

A description is made of the key update method based on the user arrangement on the key tree in performing batch rekeying hereinafter.

The key update method based on the user arrangement on the key tree may be classified into one of Departure Independent Key Tree (DIKT) and Departure Dependent Key Tree (DDKT).

Among them, the Departure Independent Key Tree (DIKT) is described first.

Figure 3:
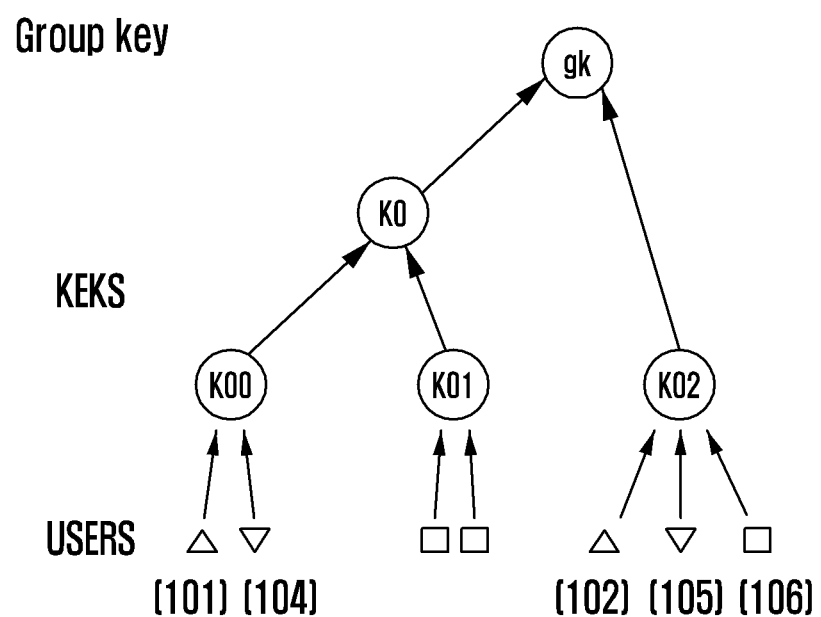
FIG. 3 is a diagram illustrating an exemplary structure of the Departure Independent Key Tree (DIKT).

FIG. 3 is a diagram illustrating an exemplary structure of the Departure Independent Key Tree (DIKT).

The DIKT is the key tree structured independently from the departure times of the users as a conventional method for building a key tree. FIG. 3 shows a normal key tree in which the group members are arranged randomly regardless of their group departure times.

In FIG. 3, the triangles and quadrangles denote the users included in the group and it is assumed that the users represented by the same polygonal shape depart the group at the same time in the batch rekeying.

For example, if the users 101 and 102 depart the group, the group communication data have to be blocked to the departed users and thus the keys k00, k02, k0, and gk known to the departed user 101 and 102 have to be updated and redelivered using the above-described LKH method.

Meanwhile, the users departing the group may be distributed on the key tree which is worst case in the batch key update method as shown FIG. 3. In this case, most keys on the tree have to be updated inefficiently. Typically, the users are distributed evenly, it is likely that the worst case occurs frequently. This increases the communication cost for updating the group key. However, since it is impossible to know the departure times of the users, it is not easy to improve the throughput with KDC in the periodic batch key update method.

Meanwhile, the Departure Dependent Key Tree (DDKT) determines the position at which the user is arranged on the basis of the departure time of the user.

In order to build the key tree optimized to the communication cost, the present invention uses the departure times of the users. Such a departure time-dependent key tree is referred to as Departure Dependent Key Tree (DDKT). The DDKT acquires the information on the departure times of the user with priority and arranges the users to be optimized before departing the group with a key update protocol. In the case of key update at the leaf level of the KDC tree, if it is possible to arrange the users departing at the same time together, this minimize the number of keys shared by the departing users. That is, the number of keys to be updated is minimized, resulting in efficient key update.

Figure 4:
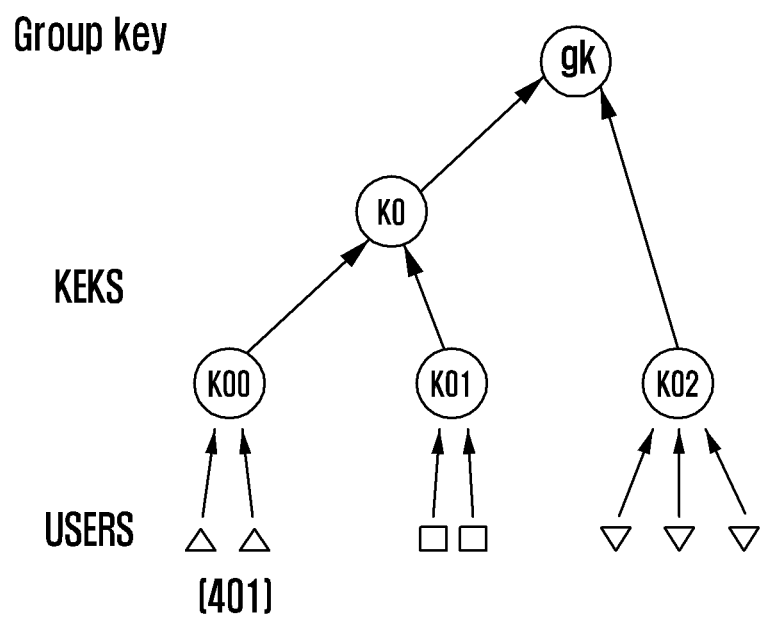
FIG. 4 is a diagram illustrating an exemplary structure of the Departure Dependent Key Tree (DDKT) according to an embodiment of the present invention.

FIG. 4 is a diagram illustrating an exemplary structure of the Departure Dependent Key Tree (DDKT) according to an embodiment of the present invention.

Unlike FIG. 3 showing the example of DIK as DIKT arranging the group members randomly regardless of their group departure times, FIG. 4 shows an exemplary of DDKT building the key tree in consideration of the group departure time of the group members.

In FIG. 4, the same shapes denote the users departing the group at the same time in batch rekeying. That is, since the users represented by the same shape depart at the same time, the method of FIG. 4 which is proposed in the present invention is very cost-effective as compared to the DIKT depicted in FIG. 3.

In the example of DIKT of FIG. 3, if the users 101 and 102 represented by the same triangle shape depart from the group, the keys k00, k0, k02, and gk have to be updated to k00', k0', k02', and gk' which have to be delivered through multicast as follows.

Enc(gk', k0')||Enc(gk', k02')||Enc(k0', k00')||Enc(k0', k01)||Enc(k00',IK)||Enc(k02',IK)||Enc(k02',IK)

In contrast, if the users 401 represented by the same triangle shape are departed from the group in DDKT of FIG. 4, only the three keys of k00, k0, and gk are updated and multicast.

Enc(gk', k0')||Enc(gk', k02')||Enc(k0', k01')

Comparing the cases of FIGS. 3 and 4 with each other, the Departure

Dependent Key Tree of FIG. 4 is capable of reducing the number of keys to be updated and the number of messages required for key update.

Descriptions are made of the problem of the conventional technology and the proposal of the present invention hereinafter.

It is assume that the users are sorted into $\hat{b}$ sets, i.e. $\hat{\omega}_0$, $\hat{\omega}_1, \ldots, \hat{\omega}_{\hat{b}1}$ and the users departing at the same time belongs to the same set and the users depart by set in a temporal order. Also it is assumed that a certain user enters at time $m\hat{b}+p$ and departs at time $n\hat{b}+q$ ($n>m$, $0<=p$, $q<^{\hat{b}}$, and m, n, p, and q are integers).

In the conventional DDKT technology, if a user enters at time $m\hat{b}+p$, a number of users decreases in the set $\hat{\omega}_p$ instantaneously. Because the user departs the set $\hat{\omega}_p$. Then the key tree becomes unbalanced and the unbalance of the key tree may cause extra communication overhead in the process of group key update.

Accordingly, in the conventional DDKT technology, the entry user is included in $\hat{\omega}_p$ and the moves the user to $\hat{\omega}_q$ before the time of $\hat{b}$ the user departs. This process progresses with Move function and incurs extra overhead. That is, since it is necessary to search for the users to depart in a period, move them to another set, and deliver a sub-group key of the new group, this incurs operation overhead and communication overhead.

In the technology proposed by the present invention, the user is included in $\omega_q$ initially without use of Move function. In this case, there may be the overhead caused by the unbalance of the key tree but not the overhead caused by the Move function, resulting in reduction of communication and operation costs.

Preferred embodiments of the present invention are described in detail hereinafter with reference to accompanying drawings.

Prior to explaining the present invention, the mathematical symbols necessary for describing the operation principle of the embodiments of the present invention are defined as shown in table 1.

The subsets (or partitions) are updated at every rekeying interval of $\rho$ in the following order.

$$\sigma_0 \rightarrow \sigma_1 \rightarrow \sigma_2 \rightarrow \ldots \rightarrow \sigma_{b-1} \rightarrow \sigma_0 \rightarrow \sigma_1 \rightarrow \ldots$$

The individual subsets may use a key management method with the tree-based structure on the key topology, and the subgroup key works as a role of the group key as the root key in the tree-based structure of the subgroup. Accordingly, the subgroup key $k_{\sigma_j}$ is connected to the subgroup $\sigma_j$ directly.

A description is made of the operation principle of the protocol A (forward secrecy) and protocol B (backward secrecy) for short term users with reference to a flowchart hereinafter. Also, the operation principle of protocol A and protocol B are described with reference to FIG. 15. First, the protocol A cording to the first embodiment of the present invention is described.

<First Embodiment (Protocol A)>

Figure 5:
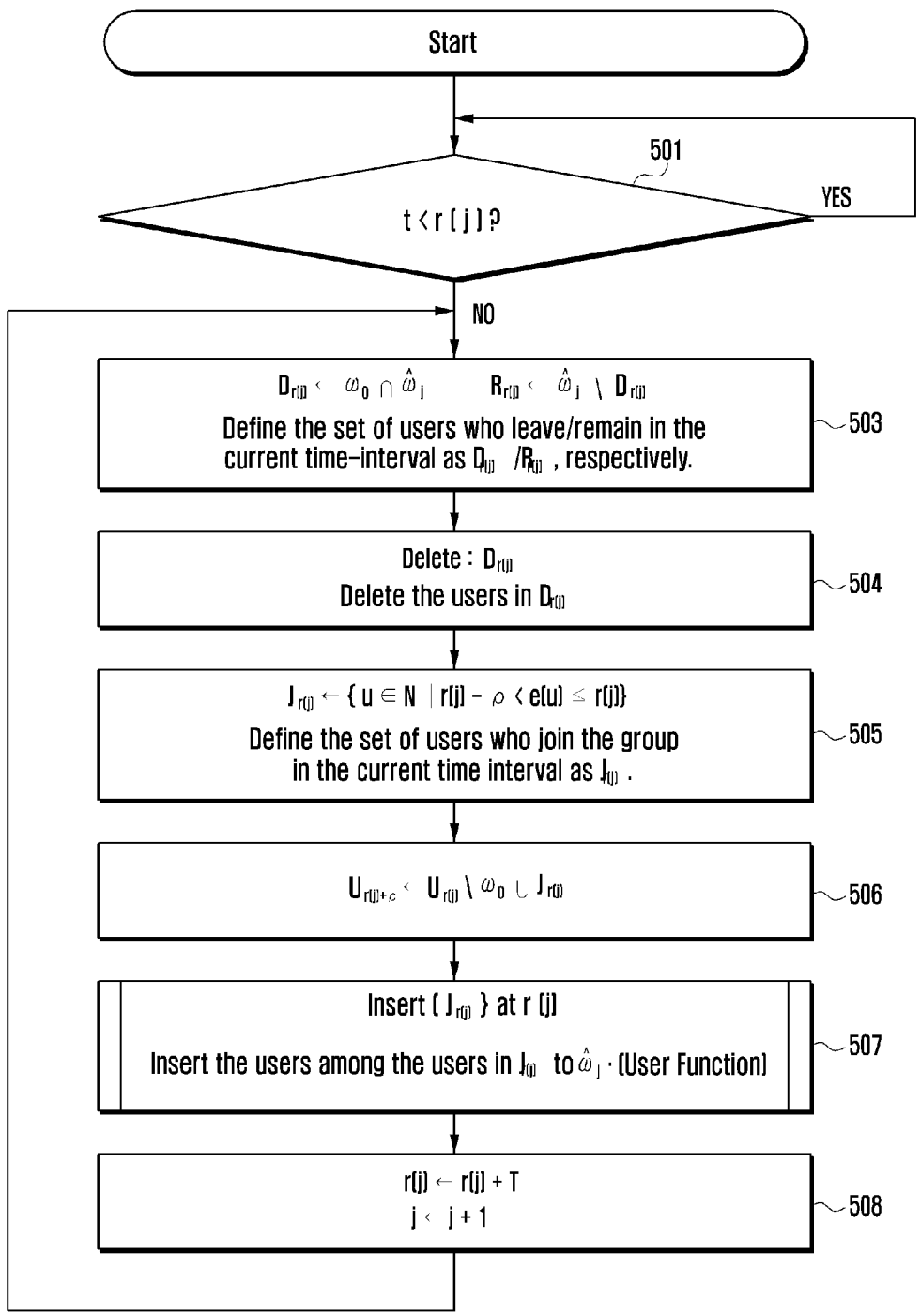
FIG. 5 is a flowchart illustrating English algorithm of Protocol A supporting forward secrecy according to the first embodiment of the present invention.

The English algorithm of Protocol A according to the first embodiment of the present invention supporting the forward secrecy is shown in table 2 and depicted into a flowchart as shown in FIG. 5.

TABLE 1 b: number of partition
$\rho$: rekey interval
e(u): time when user u enter the group
d(u): time when user u departure the group
$\tau(u)$: time when user belong to the group. i.e., d(u) − e(u).
T: one period (T=b × $\rho$)
r(j) (0 ≤ j ≤ b − 1): $j^{th}$ time point. Absolute time, initially having value of r(j)=j$\rho$, and updated to r(j)=r(j)+T if the rekey process ends when t=kT+j$\rho$.
$\omega_i$ (0 ≤ j ≤ b − 1): set of users to depart at rekey interval after $i^{th}$ time since now. They are processed at $i^{th}$ rekey interval from current rekey interval.
- $\omega_0$ : set of users departed at rekey interval right before. Processed immediately right now.
- $\omega_b$ : set of users distant over at least one interval from now as departure time.
$\sigma_{(0)}, \sigma_{(1)}, \sigma_{(2)}, \ldots, \sigma_{(b-1)}$: b sets acquired by dividing entire user set and indicates absolute positions of partitions. ( $\sigma_{(j)}$ includes users of which departure times are between kT+(j−1)$\rho$ and kT+j$\rho$ for non-negative integer k. In the case of Protocol B, there exists users of which $\tau(u)$ is equal to or greater than T among the users.)
$\sigma_s$ : (used only in protocol B) set of users of which $\tau(u)$ is less than T.
$D_{r(j)}$: when r(j−1) < t ≤ r(j), set of users departing the group at time t.
$R_{r(j)}$: (used only in protocol A) set of user remained without departing the group at time t when r(j−1< t ≤ r(j) among users of $\sigma_j$. That is, $R_{r(j)}^t = \sigma_j \backslash D_{r(j)}$.
$R_{r(j)}^t$ : (used only in protocal B) set of users remained without departing the group at time t when r(j−1< t ≤ r(j). That is, $R_{r(j)}^t = \sigma_j \backslash D_{r(j)}$.
$U_{r(j)}$: entire set of users belonging to to group, when r(j−1) < t ≤ r(j)
$J_{r(j)}$: entire set of users entered the group newly, when r(j−1) < t ≤ r(j)

In the present invention, the users (or terminals such as UEs) are sorted into partitions (or groups) by service reception start time. For this purpose, when entering the group, the user sends the KDC the information on user's group entry time and e(u) and group departure time d(u).

The present invention proposes two types of batch key update and reconfiguration systems referred to as protocol A and protocol B, respectively. The Protocol A supports forward secrecy after the key update at the batch level, and the protocol B supports two-way secrecies after and before the key update.

Here, the forward secrecy denotes the situation where the device departed from the group cannot access the group key any more. In contrast, the backward secrecy denotes the situation where the device entered the group newly cannot access the key used before entering the group.

TABLE 2

| 1: | if clock reaches r (j) then (Step 502) |
|---|---|
| 2: | Classify $\sigma_j$: departed users $D_{r(j)} = \omega_0 \cap \sigma_j$, remaining users $R_{r(j)} = \sigma_j \backslash \omega_0$; (도 503) |
| 3: | Delete $D_{r(j)}$; (Step 504) |
| 4: | Collect joining users $J_{r(j)} = \{u \in N \mid r(j − 1) < e (u) \leq r (j)\}$; (Step 505) |
| 5: | Update $P_{r(j)} \rightarrow P_{r(j)+\rho}$ considering the batch request: $U_{r(j+1)} = (U_{r(j)} \backslash \omega_0) \cup J_{r(j)}$; (도 506) |
| 6: | Insert: $J_{r(j)}$ at r(j); (Step 507) |
| 7: | r(j) ⇐ r(j) + T; (Step 507) |
| 8: | end if |

The English Protocol A may be expressed in the Korean Protocol as shown in table 3.

TABLE 3

1. 현재 시각이 $r(j)$가 되면 (도 502)
2. $\sigma_j$의 사용자 중 직전 interval ($r(j-1)$부터 $r(j)$까지의 시간)에 나간 사용자를 골라 $D_{r(j)}$라 정의하고 $\sigma_j$의 사용자 중 남아있을 사용자를 $R_{r(j)} = \sigma_j \setminus D_{r(j)}$로 정의한 후 두 사용자들을 구분한다. (도 503)
3. $D_{r(j)}$는 직전 interval 에서 나가는 사용자이므로 key tree 에서 $D_{r(j)}$의 사용자를 지운다. (도 504)
4. 직전 interval 에 들어온 사용자를 $J_{r(j)}$라 정의한다. (도 505)
5. 가입한 사용자들의 집합을 업데이트 한다. : $U_{r(j+1)} = (U_{r(j)} \setminus \omega_0) \cup J_{r(j)}$; (도 506)
6. $J_{r(j)}$의 사용자들은 자신이 나갈 시간에 따라 insert 함수에 의해서 파티션 내에 배치된다. (도 507)
7. $r(j)$값이 $r(j)+T$로 업데이트 된다. (도 508)
8. if 문 종료

The Protocol A presented in tables 2 and 3 and FIG. 5 can be described briefly as follows. The KDC starts the process at time r(j) at step 502 of FIG. 5. The KDC sorts the users departed in the current interval among the users included in $\hat{\omega}_j$ into $D_{r(j)}$ and the remained users into $R_{r(j)}$ at step 503 of FIG. 5. Next, the KDC disjoins the users in the $D_{r(j)}$ at step 504 of FIG. 5. The KDC includes the users entering in the current interval in the $J_{r(j)}$ at step 505. The KDC updates the entire sets of the users at step 506 of FIG. 5. The KDC sorts the users in the $J_{r(j)}$ into an appropriate partition among $\hat{\omega}_0, \hat{\omega}_1, \ldots, \hat{\omega}_{\hat{b}-1}$ depending on their departure time at step 507 of FIG. 5.

Figure 6:
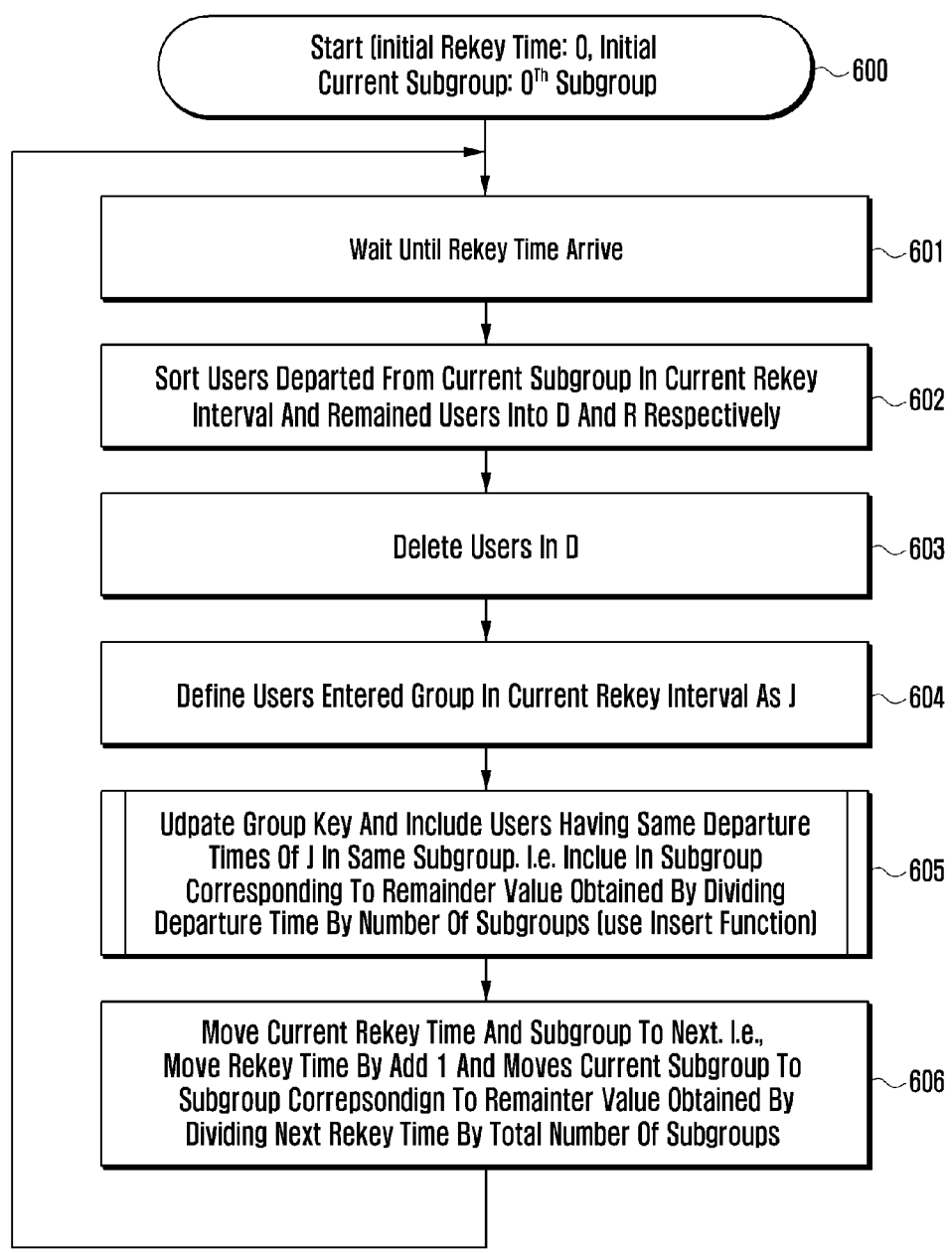
FIG. 6 is a flowchart illustrating the procedure of Protocol A according to the first embodiment of the present invention.

The procedure of protocol A according to the first embodiment of the present invention is depicted into a flowchart as shown in FIG. 6. Referring to FIG. 6, the KDC waits for the arrival of the rekey time at step 601. If the rekey time is the time when the rekeying occurs. Here, the rekeying denotes the behavior of updating the key of the group changed in group members.

The KDC sorts the users departed from the current subgroup in the current rekey interval into D and the remained users into R. The rekey interval denotes the duration between the current rekey time and the previous rekey time right before.

The KDC deletes the departed users D at step 603.

The KDC defines the users entered the group in the rekey interval as J. The KDC updates the group key and sorts the users of J into a subgroup of the users departed at the same time. That is, the rekey time is divided into the total number of subgroups sorted the users into the remained group. If the new entry J is sorted into the group, the KDC uses the Insert Function which is described later.

The KDC moves the current rekey time and the subgroup to the next interval at step 606. That is, the KDC adds 1 to the update time to move to the next interval and the next update time to the subgroup remained after diving the next updated time with the total number of subgroups.

In the protocol A according to the first embodiment of the present invention, the keys to be updated are the keys from the group key $k_{\sigma_j}$ of the departing users and the TEK. That is, since the keys owned by the users departed are all updated, the keys cannot be used and thus forward secrecy is supported.

However, once the newly entered users are assigned the key, the key can be used until it is changed. For example, the user A entered the group σ(j+i)modb between kT+(j−1)ρ and kT+jρ is assigned $k_{\sigma_{(j+1)mod b}}$ which is the key generated at (k−1)T+(j+i)ρ and updated at kT(j+i)ρ. Then the user A receives a message $Enc(TEK,k_1) \| Enc(k_1,k_2) \| \ldots \| Enc(k_h, k_{\sigma_{(j+1)mod b}})$ multicast at time (k−1)T+(j+i)ρ and then the data (encrypted with TEK) transmitted between (k−1)T+(j+i)ρ and (k−1)T+(j+i+1)ρ and enters the group to check the received TEK and data with $k_{\sigma_{(j+1)mod b}}$. Accordingly, the backward security is not guaranteed during the time of up to T−ρ.

<Second Embodiment (Protocol B)>

A description is made of the protocol B according to the first embodiment of the present invention hereinafter.

Figure 7:
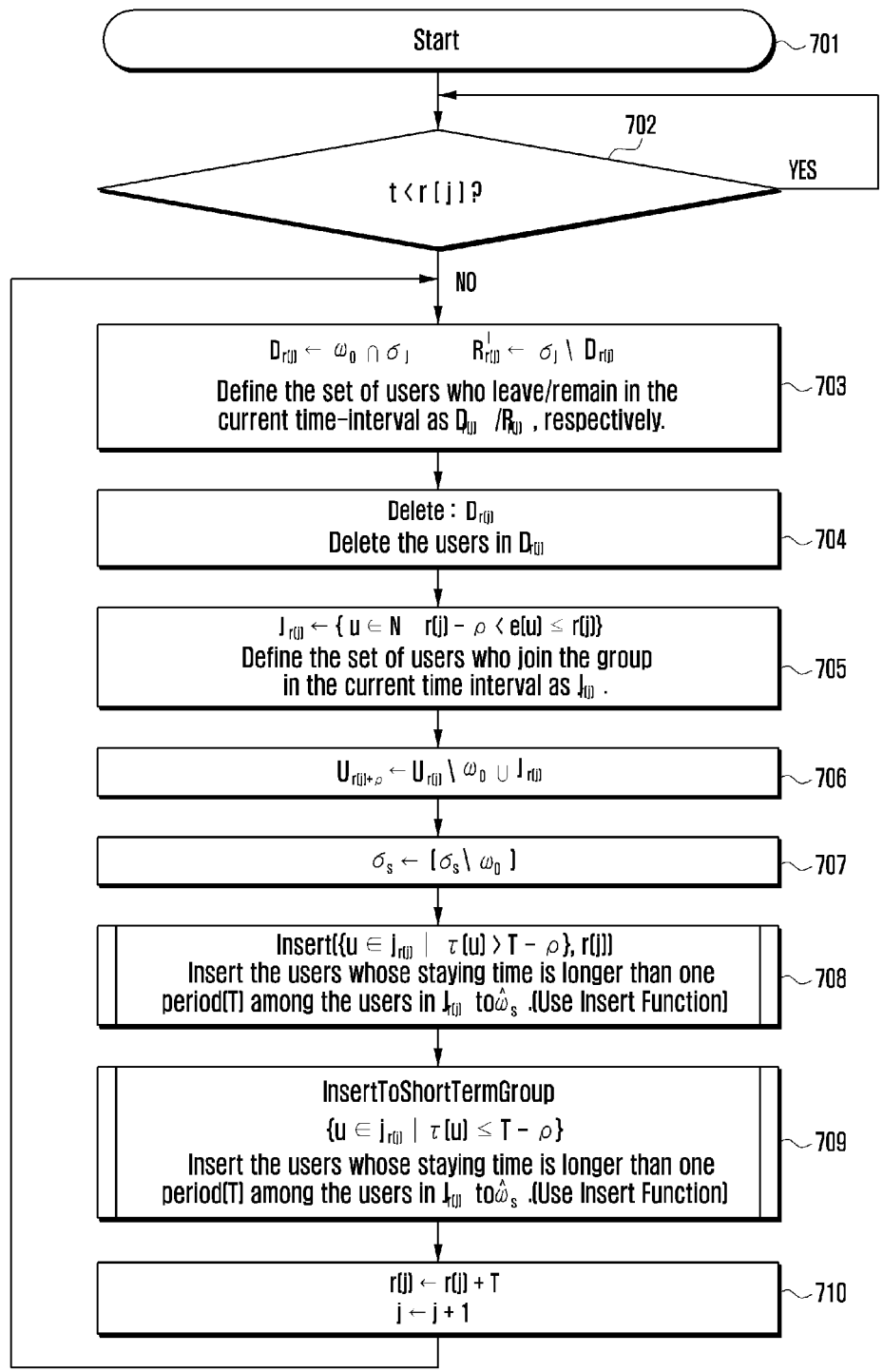
FIG. 7 is a flowchart illustrating English algorithm of protocol B supporting both the backward secrecy and forward secrecy according to the second embodiment of the present invention.

The English algorithm of protocol B according to the second embodiment of the present invention supporting both the backward and forward secrecies is shown in table 4 and depicted into a flowchart as shown in FIG. 7.

TABLE 4

1: if clock reaches r(j) then (Step 702)
2:   Classify $\sigma_j$: departed users $D_{r(j)} = \omega_0 \cap \sigma_j$, remaining users $R_{r(j)}^1 = \sigma_j \setminus \omega_0$; (Step 703)
3:   Delete $D_{r(j)}$; (Step 704)
4:   Collect joining users $J_{r(j)} = \{u \in N \mid r(j-1) < e(u) \leq r(j)\}$; (Step 705)
5:   Update $P_{r(j)} \rightarrow P_{r(j)+\rho}$ considering the batch request: $U_{r(j+1)} = (U_{r(j)} \setminus \omega_0) \cup J_{r(j)}$; (Step 706)
6:   Update the short-term user group $\sigma_s = \sigma_s \setminus (\sigma_s \cap \omega_0)$; (Step 707)
7:   Insert: $\{u \in J_{r(j)} \mid \tau(u) > T - \rho\}$ at r(j); (Step 708)
8:   InsertToShortTermGroup: $\{u \in J_{r(j)} \mid \tau(u) \leq T - \rho\}$; (Step 709)
9:   $r(j) \Leftarrow r(j) + T$; (Step 710)
10: end if The English Protocol B may be expressed in the Korean Protocol as shown in table 5.

TABLE 5

1. 현재 시각이 $r(j)$가 되면 (도 702)
2. $\sigma_j$의 사용자 중 직전 interval 에 나간 사용자를 골라 $D_{r(j)}$라 정의하고 $\sigma_j$의 사용자 중 남아있을 사용자를 $R'_{r(j)} = \sigma_j \setminus \omega_0$로 정의한 후 사용자들을 구분한다. (도 703)
3. $D_{r(j)}$은 더 이상 그룹 사용자가 아니므로 key tree 에서 $D_{r(j)}$의 사용자를 지운다. (도 704)
4. 직전 interval 에 들어온 사용자를 $J_{r(j)}$라 정의한다. (도 705)
5. 가입한 사용자들의 집합을 업데이트 한다: $U_{r(j+1)} = (U_{r(j)} \setminus \omega_0) \cup J_{r(j)}$; (도 706)

TABLE 5-continued

6. Short Term Group 을 업데이트 한다. $\sigma_s = \sigma_s \setminus (\sigma_b \cap \omega_0)$; (도 707)
7. $J_{r(j)}$ 중 나갈 시각이 한 주기 이상 남은 사용자들은 자신이 나가는 시간에
   따라서 Insert 함수에 따라 파티션 내에 배치된다. (도 708)
8. InsertToShortTermGroup 함수에 따라 $J_{r(j)}$ 중 나갈 시각이 한 주기 이내인
   사용자들을 모아 $\sigma_s$ 에 넣는다. (도 709)
10. $r(j)$ 값이 $r(j)+T$ 로 업데이트 된다. (도 710)
11. if 문 종료

The Protocol B presented in tables 4 and 5 and FIG. 7 can be described briefly as follows.

First, if the current time matches r(j) at step 702, the KDC starts the process. The KDC sorts the users departing from $\hat{\omega}_j$ in the current interval into $D_{r(j)}$ and the remained users into $R_{r(j)}^i$ at step 703 of FIG. 7. The KDC disjoins the users from $D_{r(j)}$ at step 704 of FIG. 7.

The KDC includes the users entering during the current interval in $J_{r(j)}$ at step 705 of FIG. 7. The KDC updates sets of all of the sets of users at step 706 of FIG. 7.

The KDC deletes the departed users from the set σ of short term users at step 707 of FIG. 7. The KDC sorts the users included in $J_{r(j)}$ whose times included in the group is equal to or longer than a cycle $\hat{b}$ into appropriate partitions of $\hat{\omega}_0$, $\hat{\omega}_1, \ldots, \hat{\omega}_{\hat{b}-1}$ FIG. 7. At the same time, the KDC sorts the users whose times included in the group is shorter than the cycle $\hat{b}$ into $\sigma_s$.

Figure 8:
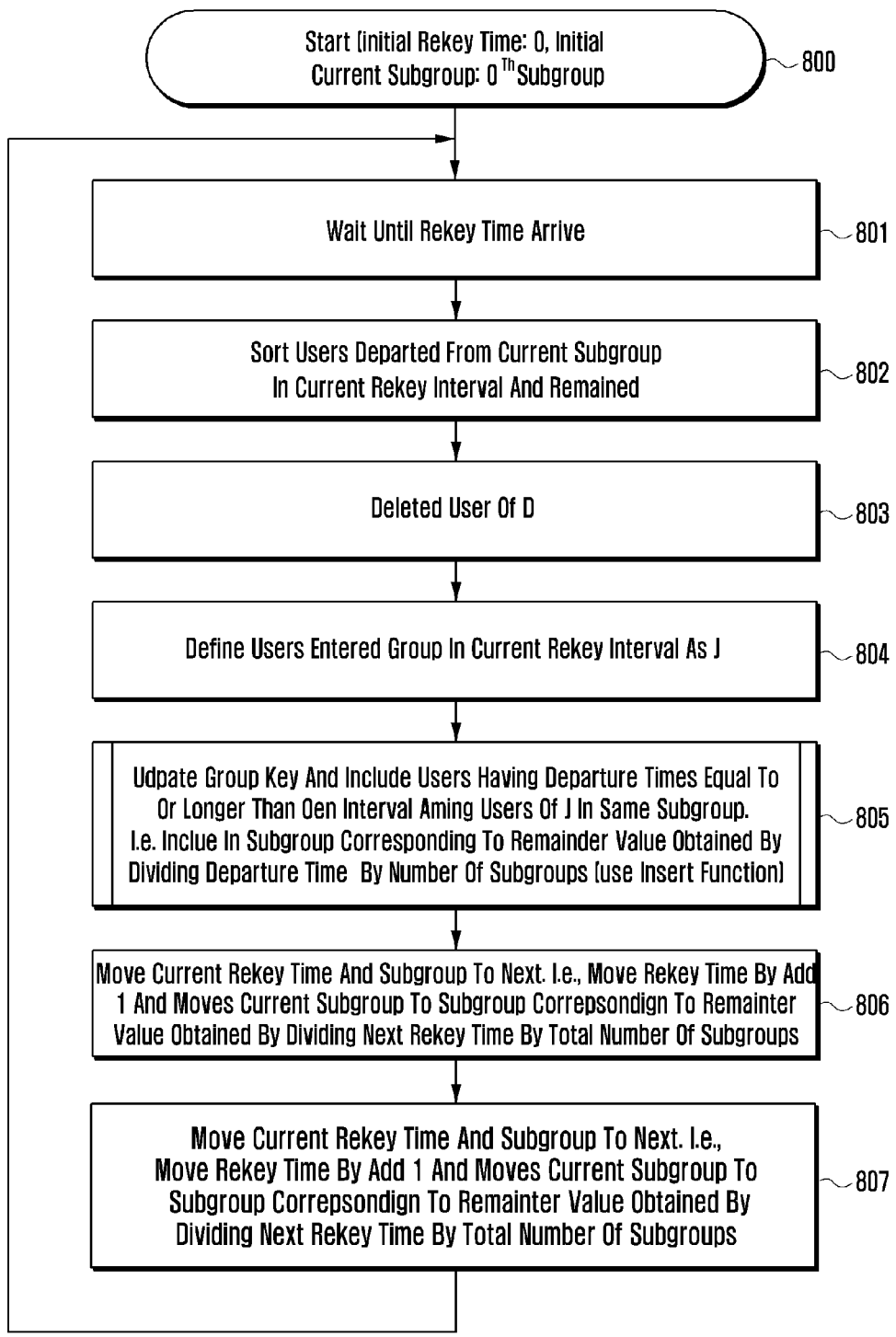
FIG. 8 is a flowchart illustrating the procedure of Protocol B according to the second embodiment of the present invention.

The processing procedure of protocol B according to the second embodiment of the present invention is depicted into a flowchart of FIG. 8.

Referring to FIG. 8, the KDC waits until the rekey time arrives at step 801. The KDC sorts the users departing from the current subgroup into D and the remained users into R at step 802. The KDC deletes the departed users D at step 803.

The KDC sorts the users entered the group in the current rekey interval into J at step 804. The KDC updates the group key and sorts the users whose predicted departure time is equal to or longer than a predetermined period (e.g. one cycle) into subgroups per same departure time at step 805. That is, the users are sorted into the subgroup remained after dividing the departure time with the total number of subgroups. In this case, if a new user J is sorted into a group, the KDC uses the Insert Function which is described later.

The KDC sorts the users whose departure prediction time is shorter than a predetermined period (e.g. one cycle) among the users of J into a short-term group and, for this purpose, the KDC uses a short insertion function (InsertToShortTerm-Group) which is described later.

The KDC moves the current rekey time and subgroup to the next duration at step 807. That is, the KDC adds 1 to the update time to move to the next interval and the next update time to the subgroup remained after diving the next updated time with the total number of subgroups.

The protocol B sorts the short term users into group $w_s$ which changes at every ρ. Accordingly, the backward secrecy is maintained for the users.

A description is made of the algorithm for the insert function used in the protocols A and B.

Figure 9:
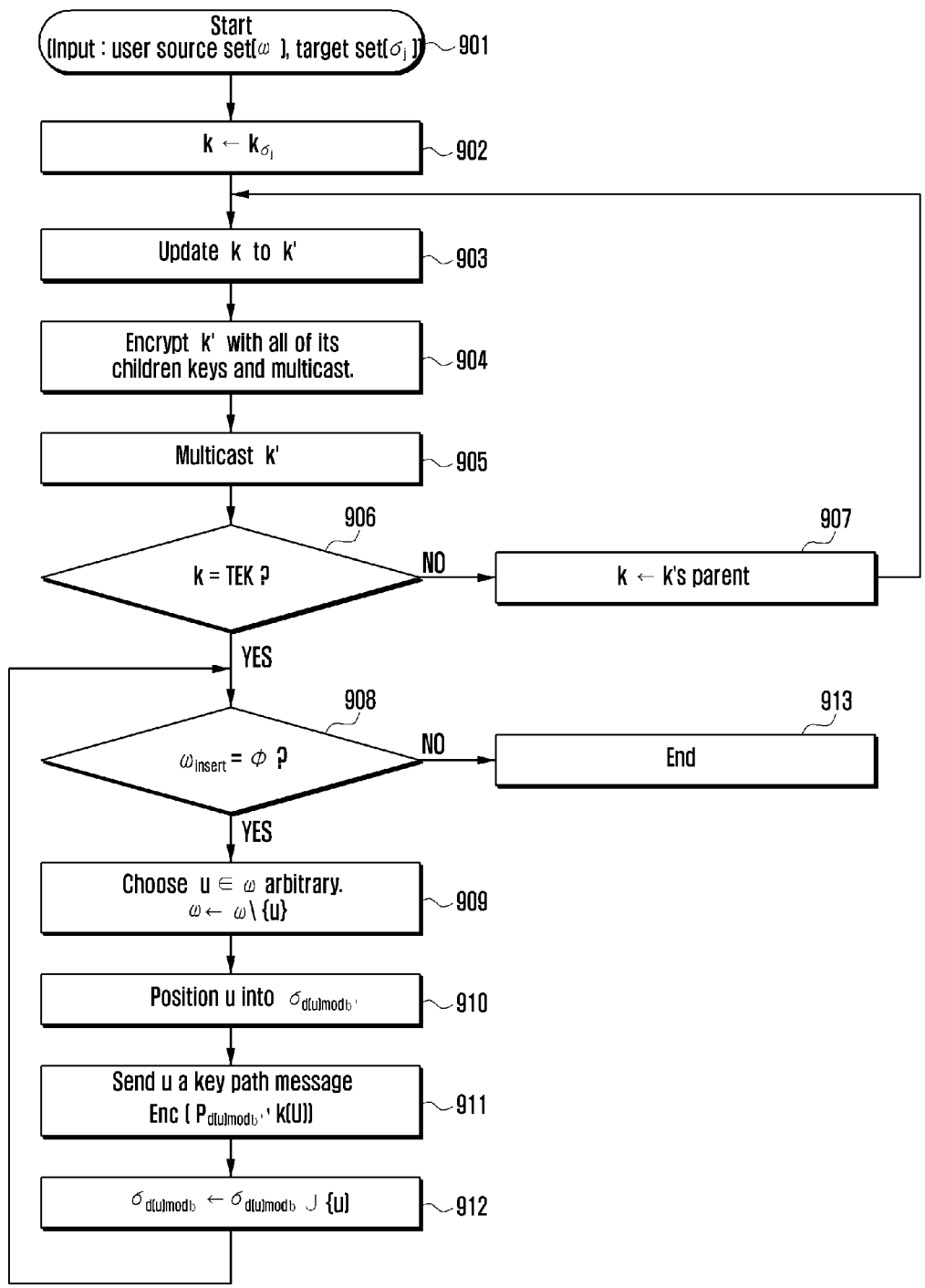
FIG. 9 is a flowchart illustrating English protocol of the insert function according to an embodiment of the present invention.

The English protocol for the insert function is shown in table 6 and depicted into a flowchart as shown in FIG. 9.

TABLE 6

| | |
|---|---|
| 1: | Function Insert: users $\omega_{insert}$ at r(j) (step 901) |
| 2: | k ← $k_{oj}$ (FIG. 902) |
| 3: | Replace key nodes with new ones: k → k' (step 903) |
| 4: | Encrypt the new k' with all of its children keys; (step 904) |
| 5: | Multicast the encrypted k'; (step 905) |
| 6: | if k = TEK then goto 11; (step 906) |
| 7: | else (arrow to no from step 906) |
| 8: | k ← k's parent (step 907) |
| 9: | go to 3; |
| 10: | end if(step 906) |
| 11: | for all ul ∈ $\omega_{insert}$ do (step 908, 909) |
| 12: | Position u into $\sigma_{d(u)mod\ b}$ based on the current partition P; (step 910) |
| 13: | send a keypath message* to $\sigma_{d(u)mod\ b}$: Enc ($P_{\sigma_{d(u)mod\ b}}$, k(u)); (step 911) |
| 14: | $\sigma_{d(u)mod\ b}$ ← $\sigma_{d(u)mod\ b}$ ∪ {u} (step 912) |
| 15: | end for (step 908) |
| 16: | end Function (step 913) |

In table 6, the key path $P_{oj}$ denotes the path of the group key in the subgroup $k_{oj}$ on the tree structure. If a key path message is transmitted, this means that the keys on the key path are encrypted with the sub-keys for transmission.

For example, transmitting a key path to the user 101 in FIG. 3 has the meaning as follows. First, the key path is gk->k0->k00->IK and, if a key path message is transmitted, this means that the following message are transmitted.

KDC->Users: M1=Enc(gk, k0)

KDC->Users: M2=Enc(k0, k00)

KDC->Users: M3=Enc(k00,IK) (IK of user 101 of FIG. 3)

Meanwhile, the Korean protocol corresponding to the English insert function is shown in table 7.

TABLE 7

Insert 함수 (한글)
1: 입력된 사용자의 집합을 $\omega_{insert}$ 라 정의하고, 이 사용자들이 들어가게 될 target
   set을 $\sigma_t$ 라 정의한다. (도 901)
2: k ← $k_{oj}$; (도 902)
3: 키 $k$ 를 $k'$ 으로 업데이트 한다; (도 903)
4: 키 $k'$ 를 $k'$ 의 자식 키들로 암호화; (도 904)
5: 암호화된 $k'$ 를 멀티캐스트한다; (도 905)
6: 조건문 시작 : $k = TEK$ 이면, step 11로 분기; (도 906)
7: $k = TEK$ 가 아니면 (도 906)
8: k ← k's parent;(도 907)
9: step 3으로 분기;
10: 조건문 끝 (도 )

TABLE 7-continued

11: 반복문 시작 : 모든 사용자 $u \in \omega_{user}$ 에 대하여 (도 908, 909)
12: 사용자 $u$ 를 $\sigma_{d(u)mod\,b}$ 에 배치한다; (도 910)
13: 사용자 $u$ 에게 $Enc\left(P_{\sigma_{d(u)mod\,b}}, k(u)\right)$ 를 전송한다; (도 911)
14: $\sigma_{d(u)mod\,b} \leftarrow \sigma_{d(u)mod\,b} \cup \{u\}$; (도 912)
15: 반복문 끝 (도 908)
16: 함수 끝 (도 913)

Figure 10:
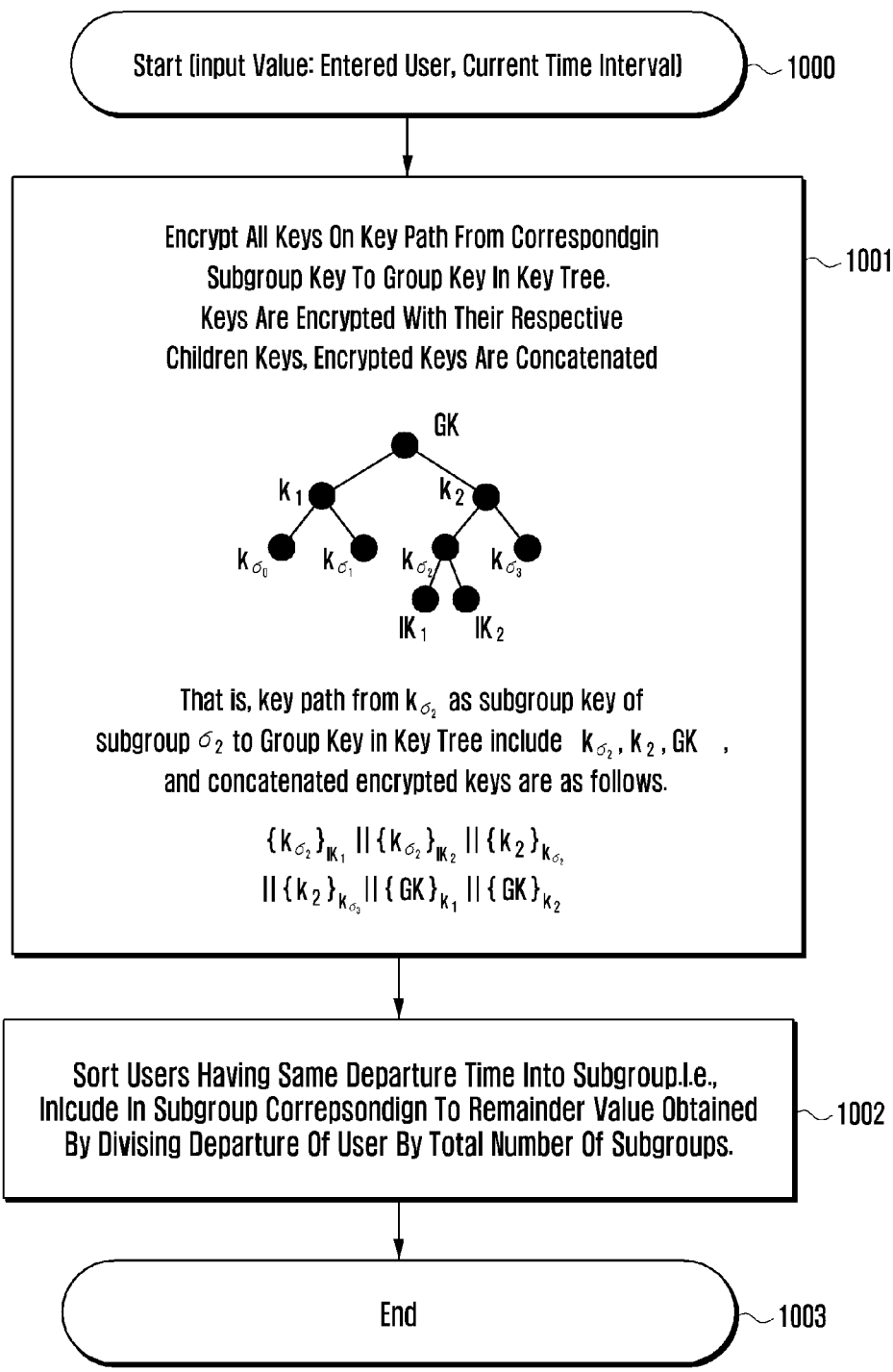
FIG. 10 is a flowchart illustrating the procedure for the KDC to execute the insert function.

The procedure for the KDC to execute the insert function is depicted as shown in FIG. 10.

First, the KDC encrypts all of the keys on the key path to the group key in the subgroup key corresponding to the current subgroup on the key tree at step 1001. The keys encrypt the children keys, and the encrypted keys are concatenated.

The KDC sorts the users having the same departure time into a subgroup at step 1002. That is, the KDC sorts a user into the subgroup corresponding to the value of remainder of dividing the departure time of the user by total number of subgroups.

A description is made of the algorithm of the short insert function (InsertToShortTermGroup) for use in protocol B.

Figure 11:
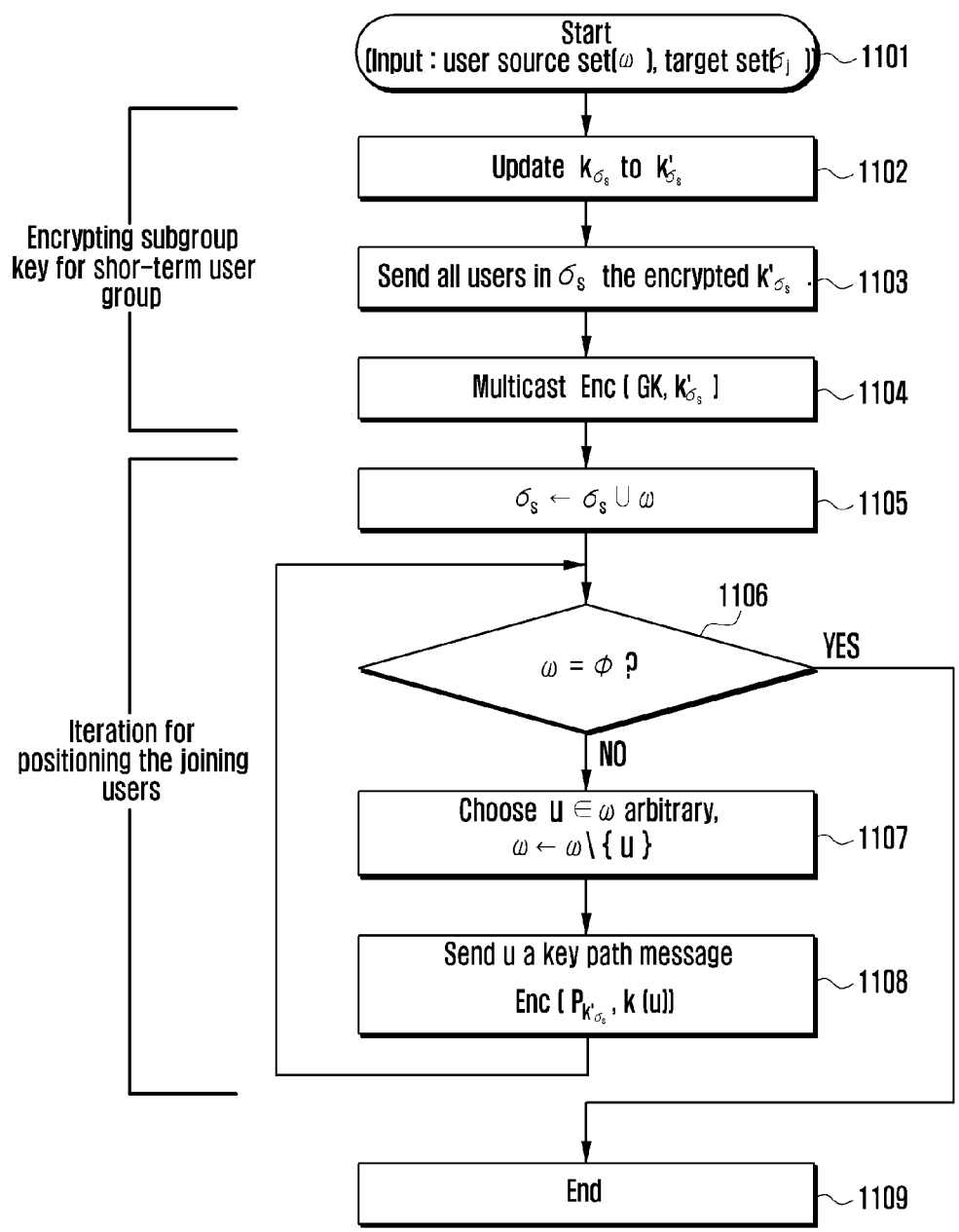
FIG. 11 is a flowchart illustrating the English protocol of the Insert function (InsertToShortTermGroup) according to an embodiment of the present invention.

The English protocol of the short insert function (InsertToShortTermGroup) is shown in table 8 and depicted into a flowchart as shown in FIG. 11.

TABLE 8

1: Function InsertToShortTermGroup: users set ω (Step 1101)
2: Update $k_{\sigma_s}$ to $k_{\sigma_s}'$ (Step 1102)
3: for all u ∈ $\sigma_s$ users do (Step 1103)
4:    Send a key $k_{\sigma_s}'$ to u: Enc($k_{\sigma_2}'$, k(u)); (Step 1103)
5: end for (Step 1103)
6: Multicast Enc(GK, $k_{\sigma_2}'$); (Step 1104)
7: $\sigma_s \leftarrow \sigma_s \cup \omega$; (Step 1105)
8: for all u ∈ σ users do (Step 1106, 1107)
9:    Send a key path messages to u: Enc($P_{k'_{\sigma_s}}$, k(u)); (Step 1108)
10: end for (Step 1106, 1107)
11: end function (Step 1109)

The Korean protocol of the short insert function (InsertToShortTermGroup) is shown in table 9.

TABLE 9

1: 입력된 사용자의 집합을 $\omega$ 라 정의한다. (도 1101)
2: 서브그룹키 $k_{\sigma_s}$ 를 $k_{\sigma_s}'$ 로 업데이트한다. (도 1102)
3: 반복문 시작 : $\sigma_s$ 의 사용자 $u$ 에 대하여, (도 1103)
4: 사용자 $u$ 에게 $Enc(k_{\sigma_s}', k(u))$ 를 전송한다. (도 1103)
5: 반복문 끝 (도 1103)
6: $Enc(GK, k_{\sigma_s}')$ 를 멀티캐스트한다; (도 1104)
7: $\sigma_s \leftarrow \sigma_s \cup \omega$ ; (도 1105)
8: 반복문 시작 : $\omega$ 의 사용자 $u$ 에 대하여, (도 1106, 1107)
9: 사용자 $u$ 에게 암호화된 key path인 $Enc\left(P_{k_{\sigma_s}}, k(u)\right)$ 를 전송한다. (도 1108)
10: 반복문 끝 (도 1106, 1107)
11: 함수 끝 (도 1109)

Figure 12:
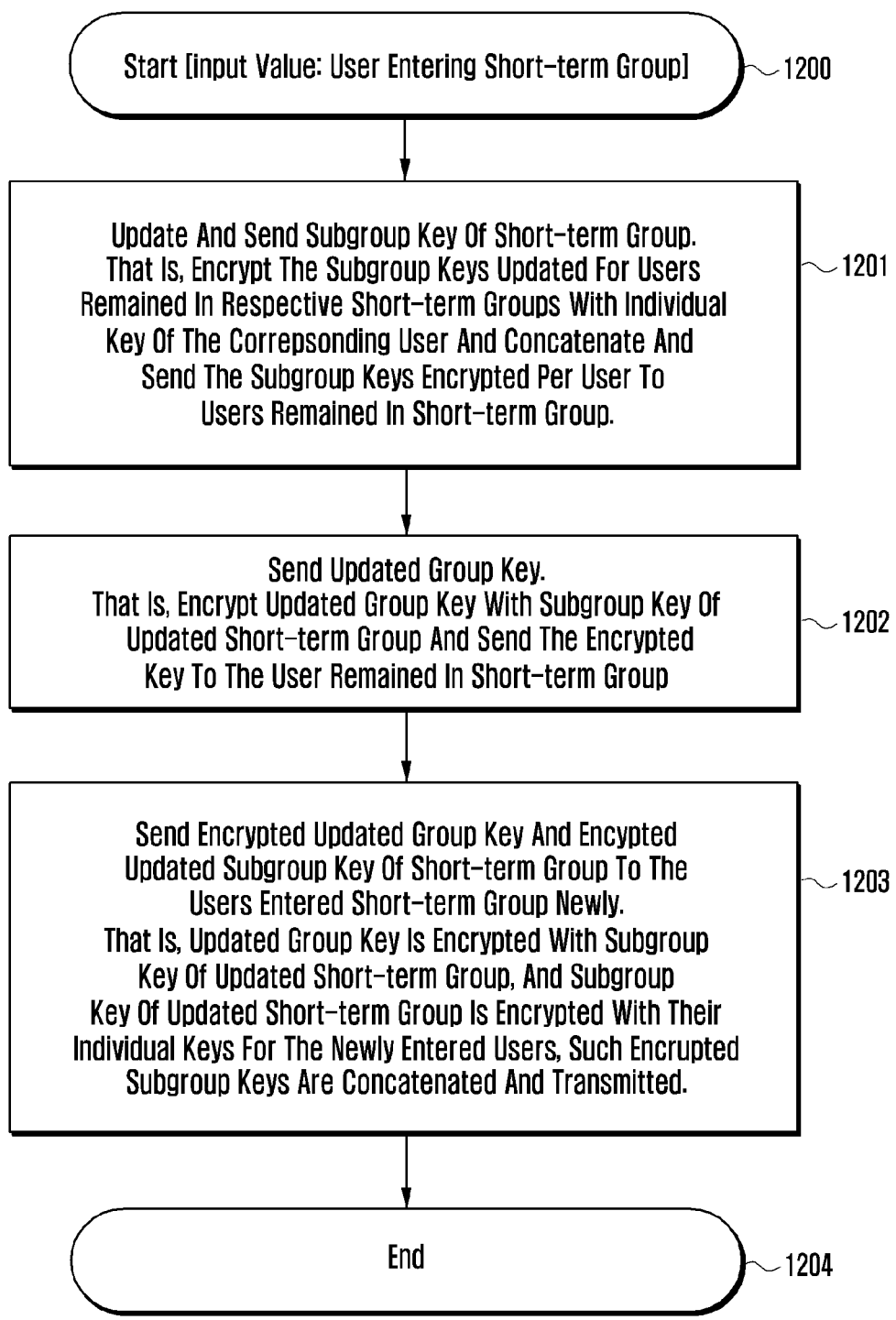
FIG. 12 is a flowchart illustrating the procedure for the KDC to execute the short term insert function (InsertToShortTermGroup)

The procedure for the KDC to execute the short insert function (InsertToShortTermGroup) is shown in FIG. 12.

First, the KDC updates the subgroup key of the short departure group (Short-Term group) and sends the undated subgroup key to the users. That is, the KDC encrypts the updated subgroup keys with the individual keys of the corresponding users remained in the short departure groups. The KDC sends the short departure group users the subgroup keys encrypted per user in series.

The KDC sends the updated group key to the user at step 1202. That is, the updated group key is encrypted with the subgroup key of the updated short departure group and sent to the remained short departure group users.

The KDC sends the encrypted updated group key and the encrypted updated subgroup key of the short departure group to the users entered the short departure group newly at step 1203. That is, the KDC encrypts the updated group key with the subgroup key of the updated short departure group, encrypt the subgroup key of the updated short departure group with the individual key of the newly entered users, and sends the encrypted subgroup key in series.

Figure 13:
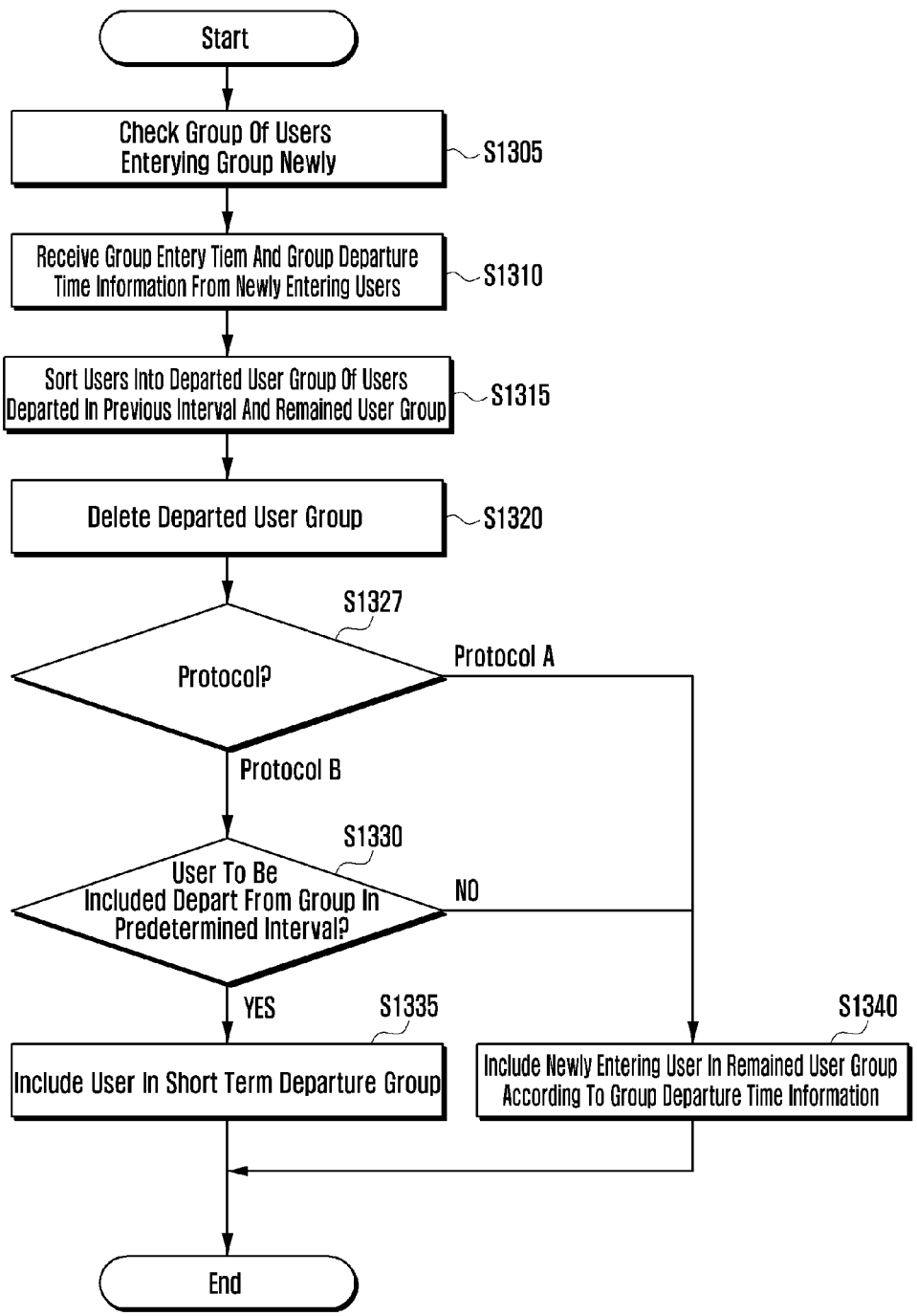
FIG. 13 is a flowchart illustrating the procedure for the KDC to execute Protocol A and Protocol B according to an embodiment of the present invention.

FIG. 13 is a flowchart illustrating the procedure for the KDC to execute Protocol A and Protocol B according to an embodiment of the present invention.

First, the KDC checks the new entry user group which is newly entering the multicast data reception group at step S1305. The KDC receives the group entry time and the group departure time information from the new entry users at step S1310.

Then the KDC sorts the users departed in the previous interval right before into a departed user group and the remained users into a remained user group at step S1315 and deletes the departed user group at step S1320.

The KDC determines whether the currently running protocol is Protocol A or Protocol B at step S1327. If Protocol A, the KDC includes the newly entered users in remained user group based on the group departure time information at step S1340.

Otherwise if protocol B, the KDC determines whether the new entry user departs the group in a predetermined interval at step S1330. If the new entry user does not depart the group in the predetermined interval, the procedure goes to step S1340. Otherwise if the new entry user departs the group in the predetermined interval, the KDC includes the corresponding user in the short departure group at step S1335.

As described above, the protocol B includes the new entry user in the remained user group at step 1340 or the short departure group at step 1335 in consideration of both the group departure time information and departure interval.

Figure 14:
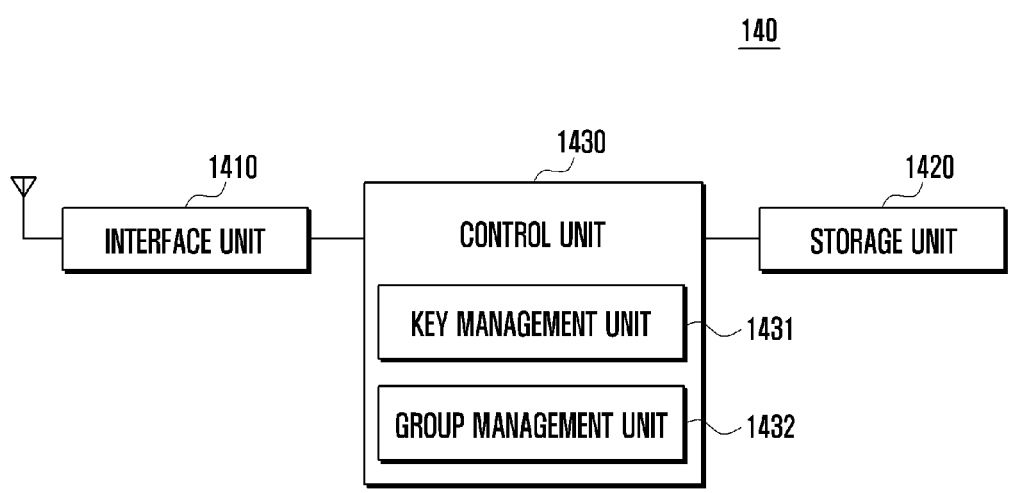
FIG. 14 is a block diagram illustrating a configuration of the KDC according to an embodiment of the present invention.

FIG. 14 is a block diagram illustrating a configuration of the KDC according to an embodiment of the present invention. As shown in FIG. 14, the KDC of the present invention includes an interface unit 1410, a storage unit 1420, and a control unit 1430.

The interface unit 1410 performs wired/wireless communication with other entities located on the network. In an embodiment of the present invention, the interface unit receives the group entry time and group departure time information from the user entering a certain group including at least one subgroup and sends the information to the control unit 1430.

The storage unit 1420 is responsible for storing the program and data necessary for the operation of the KDC according to an embodiment of the present invention. According to an embodiment of the present invention, the storage unit 1420 may store a program sorting the users having the same group departure time into the same group and, if key update is required, updating the keys of the group in a batch manner.

The control unit 1430 controls the overall operation of the components of the KDC according to an embodiment of the present invention. Particularly, the control unit 1430 may control the procedure of sorting the users having the same group departure time into the same group and updating, when key update is required, the keys of the group in a batch manner. The key management unit 1431 controls the procedure of updating, when a certain user departs from the group, the key which the user knows and sending the updated key to the other subgroup users. The key management unit 1431 controls the procedure of sending, when a certain user joins the group newly, the group key and related keys to the new subgroup joiner sorted into the group by the group manager 1432.

The group manager 1432 sorts the users entering the group newly into groups using the group entry time and group departure time information received through the interface unit 1410. In more detail, the group management unit 1432 sorts the users into the departed user group and the remained user group, deletes the departed user group, and includes the new entry user in the remained user group according to the departure time information. In this case, the group management unit 1432 may include the new entry user in the remained user group according to the remainder value obtained dividing the group departure time of the new entry user by a number of subgroups.

The group management unit 1432 determines whether the user entering the group newly is the user to depart from the group in a predetermined time and, if so, includes the user in the short term departure group and, otherwise, in a remained user group according to the group departure time information. Returning to the description on the control unit 1430, the control unit 1430 may send the group key or subgroup key to the user entering or departing the group. In more detail, the control unit 1430 sends the entry user the group key of the group and the subgroup key of the subgroup in which the entry user is included. That is, if an entry user is detected, the controller 1430 does not need to perform any key update process but send the user the keys (group key and subgroup key) for use in decrypting the encrypted multicast data.

Meanwhile, if a group departing user is detected, the control unit 1430 updates the subgroup key and group key of the subgroup in which the group departing user is included and sends the updated keys to other users remained in the group.

Although the description is directed to the case where the control unit 1430, key management group 1431, and group management unit 1432 are implemented as independent blocks responsible for different functions, it is just for the explanation convenience but not limitation to such functional split. For example, the functions in charge of the group management unit 1432 may be executed by the control unit 1430 in itself.

Hereinafter, descriptions are made of the key assignment and group sorting procedure based on Protocol A and Protocol B according to an embodiment of the present invention with reference to FIG. 15.

FIG. 15 shows an algorithm in a tree structure. The users are represented by ellipses each having two natural values separated with a hyphen (-). Here, the value at the left side of the hyphen denotes the group entry time and the right side the group departure time. If the two natural values are expressed by $\epsilon$-$\delta$, the group entry time of the user is in the range of $r(\epsilon)$-$\rho < t \leq r(\epsilon)$ and the group departure time is in the range of $r(\delta)$-$\rho < t \leq r(\delta)$. Accordingly, the entry and departure processing times are $r(\epsilon)$ and $r(\delta)$.

The key topology is updated periodically, and subgroups are arranged on the bottom layer of the tree, each subgroup having a subgroup key. The group key is at the top of the tree. The group key is managed by a key layer and, when it is transmitted for security, encrypted with the key outside one layer using the tree-based key management method as in the logical key hierarchy (LKH) as described above.

First, a description is made of the protocol A according to an embodiment of the present invention with reference to FIG. 15.

FIG. 15 shows the principle of the protocol A when the number of partitions is 4. $J_{r(5)}$ denotes the users entering the group newly at a time between $r(5)$-$\rho$ and $r(5)$, the second group updates its keys in the current interval in protocol A of FIG. 15, and all of the users departing from the group are included in the partition of the second group.

The three users in $J_{r(5)}$ are arranged on the surface of the disk according to their departure times. In detail, the users 5-8 and 5-12 are the users having the departure times in the range of $nT$-$\rho$~$nT$ (n is positive integer) and, if the number of partitions is 4, the remainder obtained by dividing group departure time 8 and 12 by 4 (number of partitions) is 0 and thus the users are included in the partition $\sigma_1$ as the first group. The user 5-19 has the departure time in the range of $nT+2\rho$~$nT+3\rho$ (n is positive integer) and the remainder obtained by dividing the group departure time 19 by 4 (number of partition) is 3 and thus the corresponding user is included in $\sigma_3$ as the second group.

The following message is transmitted. Since the user included in $\sigma_1$ departs, three keys, i.e. $k_{\sigma_1}$, $k_0$, GK, have to be updated. Accordingly, the KDC sends the following message to the users.

Enc(GK',$k_0$)||Enc(GK',$k_1$)||Enc($k'_0$,$k'_{\sigma_1}$)||Enc($k'_{\sigma_1}$,$k(u_{(4-9)})$)

Also, since it is necessary to deliver the key paths to the newly entered users 5-8, 5-12, and 5-19, the following messages are generated additionally.

To user 5-8: Enc(GK',$k'_0$)||Enc($k'_0$,$k_{\sigma_0}$)||Enc($k_{\sigma_0}$,$k(u_{(5-8)})$)

To user 5-12: Enc(GK',$k'_0$)||Enc($k'_0$,$k_{\sigma_0}$)||Enc($k_{\sigma_0}$,$k(u_{(5-12)})$)

To user 5-19: Enc(GK',$k_1$)||Enc($k_1$,$k_{\sigma_3}$)||Enc($k_{\sigma_3}$,$k(u_{(5-19)})$)

Summarizing the above description, total 14 messages are generated.

Next, a description is made of the protocol B according to an embodiment of the present invention with reference to FIG. 15.

FIG. 15 also shows the principle of the protocol B when the number of partitions is 4 like the Protocol A. $J_{r(5)}$ denotes the users entering the group newly at a time between $r(5)$-$\rho$ and $r(5)$. In Protocol B of FIG. 15, the second and fifth groups update their keys in the current interval, and all of the users departing from the groups are included in the partitions of the part colored by red. The users in $J_{(5)}$ are arranged on the disk surface according to their departure times. In detail, the user 5-8 has its departure time in an interval (T) among the users entering the group $J_{(5)}$ newly and is included in the partition $\sigma_s$ right below the group key (GK) by the short insert function (InsertToShortTermGroup) of protocol B. The user 5-12 has its departure time greater than one interval among the users entering the group $J_{(5)}$ newly, the group departure time is in the range of $nT$~$\rho$~$nT$ (n is positive integer) and the remainder obtained by dividing group departure time 12 by 4 (number of partitions) is 0 and thus is included in the partition $\sigma_0$. The user 5-19 is the user having its group departure time in the range of $nT+2\rho$~$nT+3\rho$ (n is non-negative integer) and the remainder obtained by dividing the group departure time 19 by 4 (number of partitions) is 3 and thus included in the partition $\sigma_3$.

The KDC sends the following messages to the users. Since the suer in $\sigma_1$ departs, the keys $k_{\sigma_1}$, $k_0$, $k_{\sigma_3}$, GK have to be updated. Accordingly, the following message are sendt.

Enc(GK',k'$_0$)||Enc(GK',k$_1$)||Enc(k'$_0$,k$_{\sigma_0}$)||Enc(K'$_0$,k'$_{\sigma_1}$)||Enc(K'$_{\sigma_1}$,k(u$_{(4-9)}$))

Also, since it is necessary to deliver the key paths to the newly entered users 5-8, 5-12, and 5-19, the following message are generated additionally.

To user 5-8: Enc(GK',k'$_2$)||Enc(k'$_s$,k(u$_{(5-8)}$))
To user 5-12: Enc(GK',k'$_0$)||Enc(k'$_0$,k$_{\sigma_0}$)||Enc(k$\sigma_0$,k(u$_{(5-12)}$))
To user 5-19: Enc(GK',k$_1$)||Enc(k$_1$,k$_{\sigma_3}$)||Enc(k$_{\sigma_3}$,k(u$_{(5-19)}$))

Summarizing the above description, total 15 messages are generated.

The batch key update method, apparatus, and system according to an embodiment of the present invention is capable of decreasing the cost of storing keys, removing key tree unbalance, and reducing the communication indirect costs in key updating process, resulting in improvement of batch key update efficiency.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A key update method of encrypting multicast data in a wireless communication system, the method comprising:
   receiving, by an apparatus, information on group entry times and group entry times of users entering newly a certain group including at least one subgroup;
   sorting, by the apparatus, the users into the at least one subgroup based on the group entry and departure times;
   sending, by the apparatus, the users a group key of the group and subgroup keys of the corresponding subgroups respectively;
   updating, by the apparatus, when a user departs from the group, the subgroup key of the subgroup from which the user departs and the group key, and
   transmitting, by the apparatus, the updated subgroup key and group key to the users remained in the group.

2. The method of claim 1, wherein the sorting of the users comprises:
   sorting the users into a departed user group and a remained user group and deleting the departed user group; and
   including the newly entering user in the remained user group based on the group departure time.

3. The method of claim 2, wherein the including of the newly entering user comprises including the newly entering the user in the remained user group according to a remainder value obtained by diving the group departure time of the newly entering user by a number of the subgroups.

4. The method of claim 2, wherein the including of the newly entering users comprises:
   determining whether the newly entering user is the user to depart from the group in a predetermined time; and
   including, when the newly entering user is the user to depart from the group in the predetermined time, the newly entering user in a short term departure group.

5. The method of claim 4, wherein the including of the newly entering users comprises including, when the newly entering user is not the user to depart from the group in the predetermined time, the newly entering user in the remained user group.

6. An apparatus of updating and delivering keys encrypting multicast data in a wireless communication system, the apparatus comprising:
   an interface unit configured to receive information on group entry times and group entry times of users entering newly a certain group including at least one subgroup; and
   at least one hardware processor configured to:
      sort the users into the at least one subgroup based on the group entry and departure times, sends the users a group key of the group and subgroup keys of the corresponding subgroups respectively,
      update, when a user departs from the group, the subgroup key of the subgroup from which the user departs and the group key, and
      transmit the updated subgroup key and group key to the users remained in the group.

7. The apparatus of claim 6, wherein the at least one hardware processor is further configured to:
   sort the users into a departed user group and a remained user group,
   delete the departed user group, and
   include the newly entering user in the remained user group based on the group departure time.

8. The apparatus of claim 7, wherein the at least one hardware processor is further configured to include the newly entering the user in the remained user group according to a remainder value obtained by diving the group departure time of the newly entering user by a number of the subgroups.

9. The apparatus of claim 6, wherein the at least one hardware processor is further configured to:
   determine whether the newly entering user is the user to depart from the group in a predetermined time and
   include, when the newly entering user is the user to depart from the group in the predetermined time, the newly entering user in a short term departure group.

10. The apparatus of claim 9, wherein the at least one hardware processor is further configured to include, when the newly entering user is not the user to depart from the group in the predetermined time, the newly entering user in the remained user group.

* * * * *